(12) United States Patent
Mitchell

(10) Patent No.: US 9,513,098 B2
(45) Date of Patent: *Dec. 6, 2016

(54) EXPLOSIVE MATRIX ASSEMBLY

(71) Applicant: Jon K. Mitchell, Bradenton, FL (US)

(72) Inventor: Jon K. Mitchell, Bradenton, FL (US)

(73) Assignee: Matrix X, LLC, Bradenton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,248

(22) Filed: Nov. 9, 2015

(65) Prior Publication Data

US 2016/0116264 A1   Apr. 28, 2016

Related U.S. Application Data

(63) Continuation of application No. 13/786,682, filed on Mar. 6, 2013, now Pat. No. 9,395,168.

(51) Int. Cl.
| | |
|---|---|
| *F42D 5/04* | (2006.01) |
| *F42D 1/02* | (2006.01) |
| *F42D 3/00* | (2006.01) |
| *F41H 11/14* | (2006.01) |
| *C06C 5/04* | (2006.01) |
| *F42C 19/08* | (2006.01) |
| *G01B 3/30* | (2006.01) |
| *F41H 11/00* | (2006.01) |
| *F42B 1/00* | (2006.01) |
| *F42B 3/26* | (2006.01) |
| *F42C 19/02* | (2006.01) |

(Continued)

(52) U.S. Cl.
CPC .............. *F42C 19/0807* (2013.01); *C06C 5/04* (2013.01); *F41H 11/00* (2013.01); *F41H 11/14* (2013.01); *F42B 1/00* (2013.01); *F42B 3/26* (2013.01); *F42C 19/02* (2013.01); *F42C 19/08* (2013.01); *F42D 1/02* (2013.01); *F42D 3/00* (2013.01); *F42D 5/04* (2013.01); *G01B 3/30* (2013.01); *F42B 3/087* (2013.01); *F42B 33/06* (2013.01)

(58) Field of Classification Search
CPC ........... C06C 5/00; C06C 5/04; F41H 11/12; F41H 11/14; F41H 11/00; F42B 1/00; F42B 1/02; F42B 3/087; F42B 33/06; F42B 3/26; F42D 3/00; F42D 5/04; F42D 1/02; F42C 19/02; F42C 19/08; F42C 19/0807
USPC ......... 102/275.7, 275.8, 403; 89/1.13; 86/50
See application file for complete search history.

(56) References Cited

U.S. PATENT DOCUMENTS

| 2,455,354 | A | * | 12/1948 | Bisch | ...................... F41H 11/14 |
|---|---|---|---|---|---|
| | | | | | 102/403 |
| 3,242,862 | A | * | 3/1966 | Werner | .................... B63G 7/00 |
| | | | | | 102/403 |
| 4,586,602 | A | * | 5/1986 | Levey | ..................... F42B 39/30 |
| | | | | | 102/293 |

(Continued)

FOREIGN PATENT DOCUMENTS

FR   2664688 A1 *   1/1992   ............. F41H 11/14

*Primary Examiner* — James S Bergin
(74) *Attorney, Agent, or Firm* — Ann I. Dennen

(57) ABSTRACT

The present disclosure is an explosive matrix assembly that has a single detonating cord formed into a grid. The grid has a first plurality of detonating cord portions lying in a first plane and a second plurality of detonating cord portions lying in a second plane, and the first plurality of detonating cord portions perpendicularly overlay the second plurality of detonating portions. Additionally, the explosive matrix comprises a sheet of adhesive material coupled to the grid to retain a grid shape of the detonating cord.

19 Claims, 11 Drawing Sheets

(51) Int. Cl.
*F42B 33/06* (2006.01)
*F42B 3/087* (2006.01)

(56) References Cited

U.S. PATENT DOCUMENTS

| | | | | |
|---|---|---|---|---|
| 4,768,417 A * | 9/1988 | Wright | ............... | B63G 9/04 |
| | | | | 102/406 |
| 4,817,787 A * | 4/1989 | Owen | ............... | F42B 39/30 |
| | | | | 206/3 |
| 4,823,672 A * | 4/1989 | Eidelman | ............ | F41H 11/14 |
| | | | | 102/403 |
| 5,005,694 A * | 4/1991 | Davis | ............... | F42B 39/30 |
| | | | | 102/275.1 |
| 5,437,230 A * | 8/1995 | Harris | ............... | F41H 11/14 |
| | | | | 102/302 |
| 6,182,553 B1* | 2/2001 | Peterson | ............ | B63G 7/02 |
| | | | | 102/403 |
| 7,000,545 B2* | 2/2006 | Sansolo | ............ | F42D 3/00 |
| | | | | 102/275.12 |
| 7,410,049 B2* | 8/2008 | O'Brien | ............ | F42B 39/30 |
| | | | | 102/275.12 |
| 7,913,624 B2* | 3/2011 | Mitchell | ............ | C06C 5/04 |
| | | | | 102/275.7 |
| 9,234,727 B2* | 1/2016 | Mitchell | ............ | F42B 3/26 |

* cited by examiner

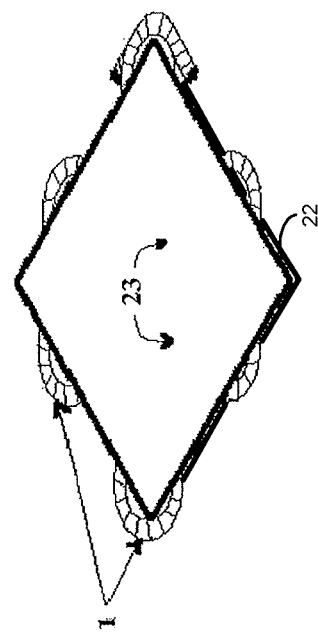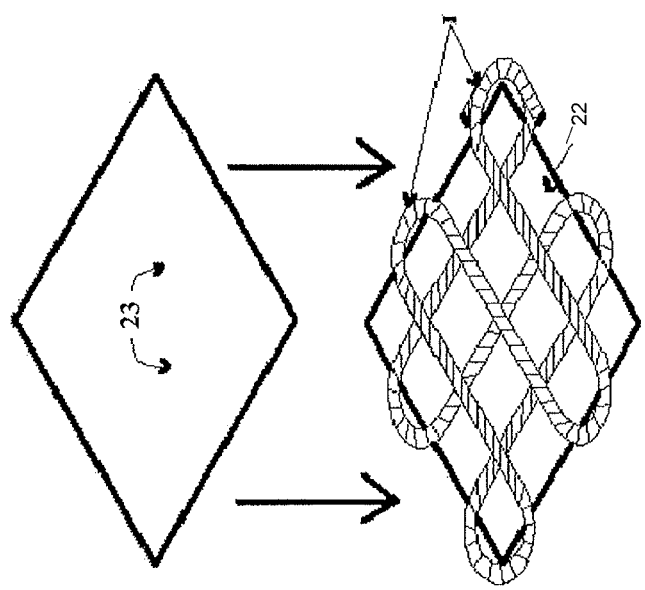
FIG. 7

EXPLOSIVE MATRIX ASSEMBLY

CROSS REFERENCE TO RELATED APPLICATION

This application is a continuation of and claims priority to U.S. patent application Ser. No. 13/786,682 entitled Explosive Matrix Assembly and filed on Mar. 6, 2013, which is incorporated herein by reference in its entirety.

BACKGROUND

Field

The present invention relates generally to detonating cord, and more particularly to explosive assemblies formed from detonating cord, and further, to explosive assemblies forming a grid from detonating cord.

Description of the Problem and Related Art

The general concept of using detonating cord to make an explosive matrix as an explosive counter charge is well known, as exemplified by U.S. Pat. Nos. 2,455,354; 3,242,862; 4,768,417; 5,437,230; and 6,182,553; and by the U.S. Navy's Distributed Explosives Technology, described in "Distributed Explosive Technology (DET) Mine Clearance System (MCS) Ex 10 Mod 0 Program Life Cycle Cost Estimate for Milestone III" (Jun. 4, 1999). These prior designs were created for large military applications. Such applications require significant manpower and financial resources. These prior art explosive matrices must be manufactured well in advance of their usage. Field assembly is not practical because they are a complex of multiple lengths of detonating cords joined together. Moreover, due to cost, complexity and time of manufacturing, these prior art explosives matrices have been infeasible for commercial use as a blasting charge. In addition, these prior art explosive matrices are heavy and cumbersome to transport. They use rope or cord to hold the detonating cord together, creating undesirable bulk and weight.

Another shortcoming of these matrices results from the fact that detonating cord detonates linearly from the point of initiation, proceeding therefrom along the cord. Consequently, detonating cord can fail to propagate the detonation wave where the cord makes sharp turns, especially when large grain detonating cord is used. In some prior art designs, in order to assure sufficient transfer of the detonating wave between intersecting cords, clamps were used at all points of intersection of detonating cord. This adds further complexity and bulk to these prior art designs.

On the other hand, use of low grain non-propagating detonating cord is not always possible in prior art explosive matrices. Some prior art devices initiate at one point, in one direction, and use multiple lengths of detonating cord coupled together, which compromises reliability. To increase reliability, other explosive matrices incorporate multiple initiation points and multiple lengths of detonating cord, again making the design more complex and the assembly more complicated and expensive.

A later example that addressed many of these shortcomings is taught in U.S. Pat. No. 7,913,624 to the inventor hereof, wherein the explosive matrix assembly permits the construction of explosives counter charges which are more efficient, safer and less costly than the above mentioned prior art explosive matrices. It is typically assembled from a single length of detonating cord formed into a grid-like matrix pattern, and a small number of cable ties and or tape are required to force the detonating cord into 90 degree angles and to hold the assembly together. However, the detonating cord must be forced into position, which may be made easier with a field assembly tool, but the design of the field assembly tool sometimes creates less than perfect right angles throughout the matrix assembly. Furthermore, due to the geometric design of the grid, the matrix will always have intersections that consist of four over-laid sections of detonating cord, while two of the outer sides will always have three over-laid sections of detonating cord. This makes the charge non-uniform.

BRIEF DESCRIPTION OF THE DRAWINGS

The present invention is described with reference to the accompanying drawings. In the drawings, like reference numbers indicate identical or functionally similar elements.

FIG. 3A is an end view of an exemplary side member comprising two identical members slidingly engaged with one another;

FIG. 7 depicts another exemplary embodiment of an explosive matrix assembly as disclosed herein;

DETAILED DESCRIPTION

The various embodiments of the disclosed explosive matrix and their advantages are best understood by referring to FIGS. 1 through 11 of the drawings. The elements of the drawings are not necessarily to scale, emphasis instead being placed upon clearly illustrating the principles of the invention. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

This invention may be provided in other specific forms and embodiments without departing from the essential characteristics as described herein. The embodiments described above are to be considered in all aspects as illustrative only and not restrictive in any manner. The following claims rather than the description below indicate the scope of the invention.

Figure 1:
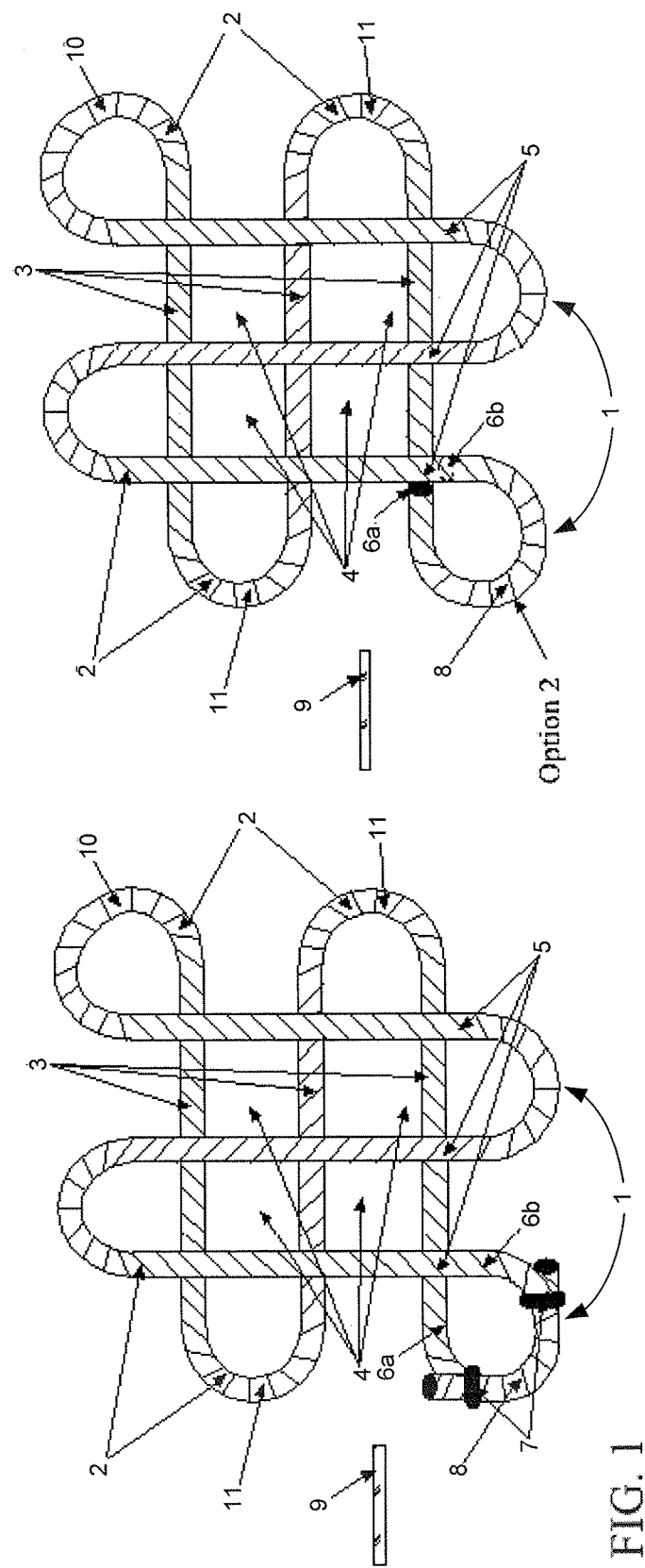
FIG. 1 illustrates two options for an exemplary embodiment of an explosive matrix assembly using a single length of detonating cords as disclosed herein.

Referring to the drawings, FIG. 1 depicts a preferred embodiment of the explosive matrix assembly 1. The explosive charge is provided by a single length of detonating cord 2 that is configured into a first set of at least three parallel straight portions 3 lying in a first plane. There are equal spaces 4, which can altered in size depending upon the desired size of the overall matrix assembly, but will always be equal to each other within the same explosives matrix assembly, separating the straight portions from each other. The detonating cord is further configured so that there is a second set of at least three more parallel straight portions 5 that are perpendicular to the first set and lying in a second plane. The second set of straight portions 5 are spaced in a manner similar to the first set of straight portions 3. At one end of each parallel straight portions 3, 5 of detonating cord, there is a looped portion 11.

In one embodiment, the detonating cord 2 is further configured so that two ends of the detonating cord, 6a and 6b, are fastened together with ties or tape 7 to form a closed loop 8, or as depicted in Option 2, looped back such that the ends 6a and 6b meet and abut one another. This arrangement may be secured with sheet tape or polyethylene foam sheets 22 and 23, as depicted in FIG. 7, to secure the closed loop.

The explosive initiator 9 is shown in FIG. 1. The explosive initiator 9 can be attached to the detonating cord 2 at any point within the explosives matrix assembly 1. In a preferred embodiment, each of the first and second sets of portions of detonating cord comprises an odd number of parallel straight portions 3, 5. The reason for the odd number of parallel straight portions is so that a single looped portion 10 of detonating cord may run between the two sets of parallel detonating cords at a point that is diagonally across from the looped ends 6a and 6b that are secured to each other.

Figure 2:
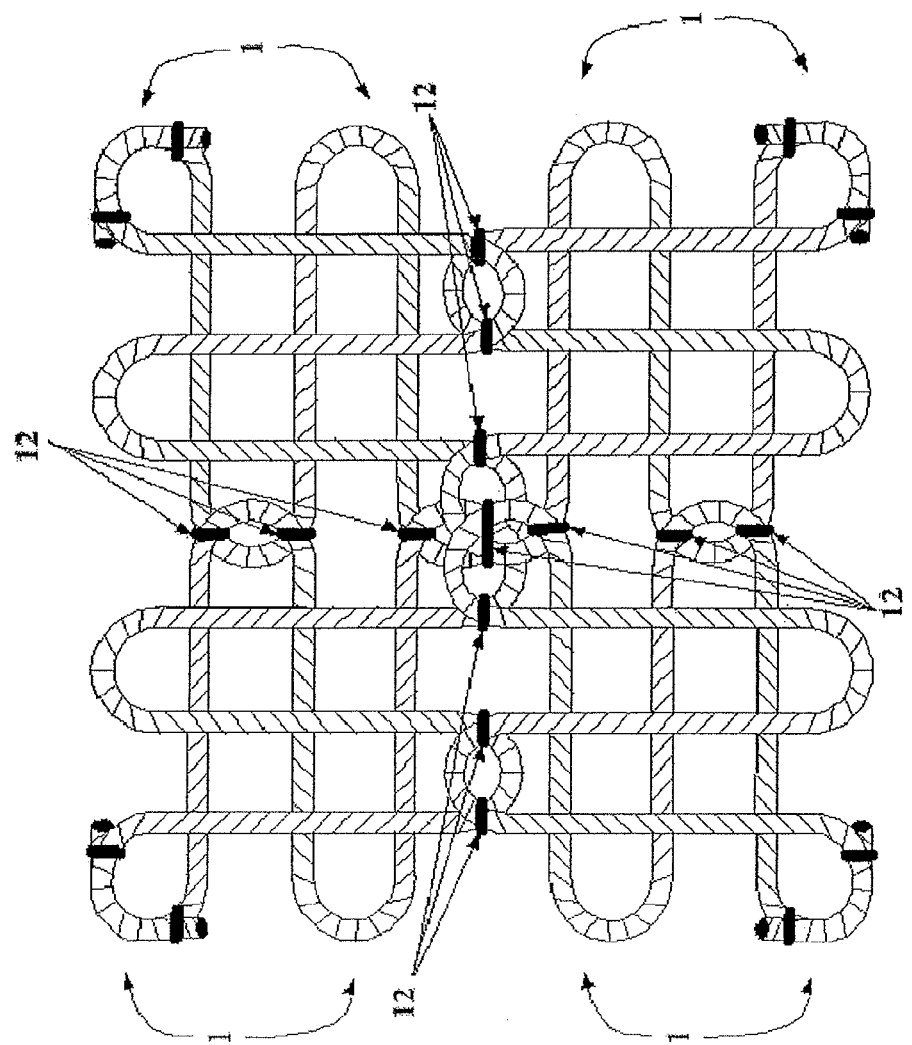
FIG. 2 illustrates an exemplary embodiment in which two or more explosive matrix assemblies may be fastened together.

Typically, the perimeter of each explosive matrix assembly 1 roughly defines a rectangular panel, the maximum size of which may be made according to the intended function, the minimum size dependent upon the limited flexibility of detonating cord 2. Alternatively, in the event a larger explosive matrix 1 is desired, assembly panels may be joined together. For example, if the explosive matrix must cover a larger surface area, two or more explosive matrix assemblies are secured to one another by cable ties 12, as depicted in FIG. 2. All explosive matrix assembly panels 1 are secured to one another can be initiated by the same initiator as would be appreciated by those skilled in the relevant arts.

The first step in deploying the matrix 1 is for the explosives technician to decide how large an explosive matrix area is needed to completely cover the surface area required. If the surface area required is greater than the surface area of a single explosives matrix assembly 1, a sufficient number of explosive matrix assembly panels 1 may be made and secured to one another by additional cable ties 12 as depicted in FIG. 2.

The explosives technician determines the net explosive weight ("N.E.W.") of the counter charge needed to perform the explosives work required. The N.E.W. of the matrix charge is based on the area of the matrix charge and detonating cord grain weight. Charts or diagrams may be prepared to provide users of the matrix tool detailed information on the assembly of the matrix charge, the amount of detonating cord needed for a specific size matrix charge, and the N.E.W. for the matrix charge based on the grains per foot of detonating cord and the areal size of the matrix charge.

Figure 3:
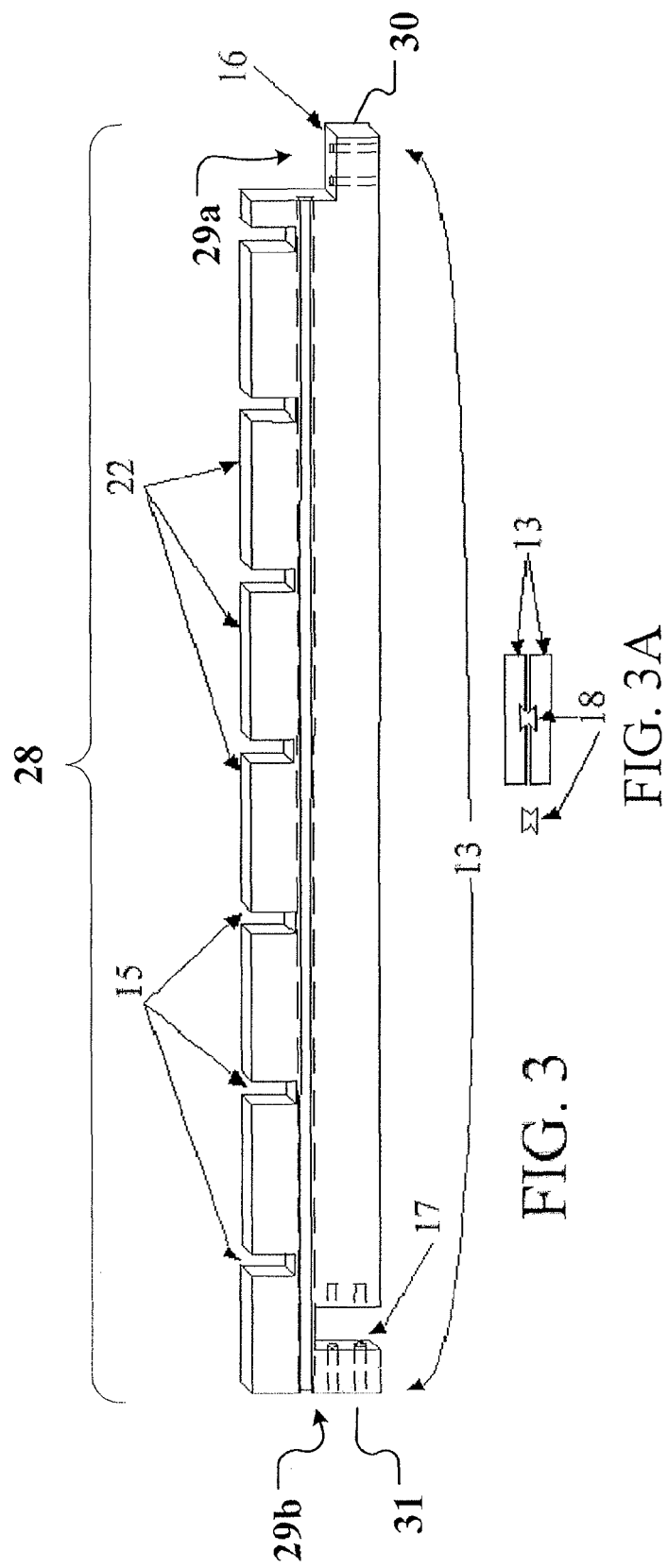
FIG. 3 depicts a one side member of an exemplary tool useful for forming an explosive matrix assembly as disclosed herein.

In order to quickly and conveniently assemble the explosive matrix 1 in the field, an assembly tool 21 may be provided, as shown in FIGS. 3 through 6. The assembly tool 21 is designed so that it may be carried disassembled to the place where it will be used to deploy the matrix 1. An exemplary assembly tool 21 may include four or eight substantially identical side members 13, an example of which is illustrated in FIG. 3. In the illustrated embodiment, each of the side members 13 comprises an elongated member having at least one castellated edge 28 along a long edge defining a set of recesses 15 and interstitial tabs 22. The castellated edge 28 should define at least three, and preferably six, or more recesses 15, each of which are dimensioned to receive and engage detonating cord and accommodate the diameter of the cord.

Figure 4:
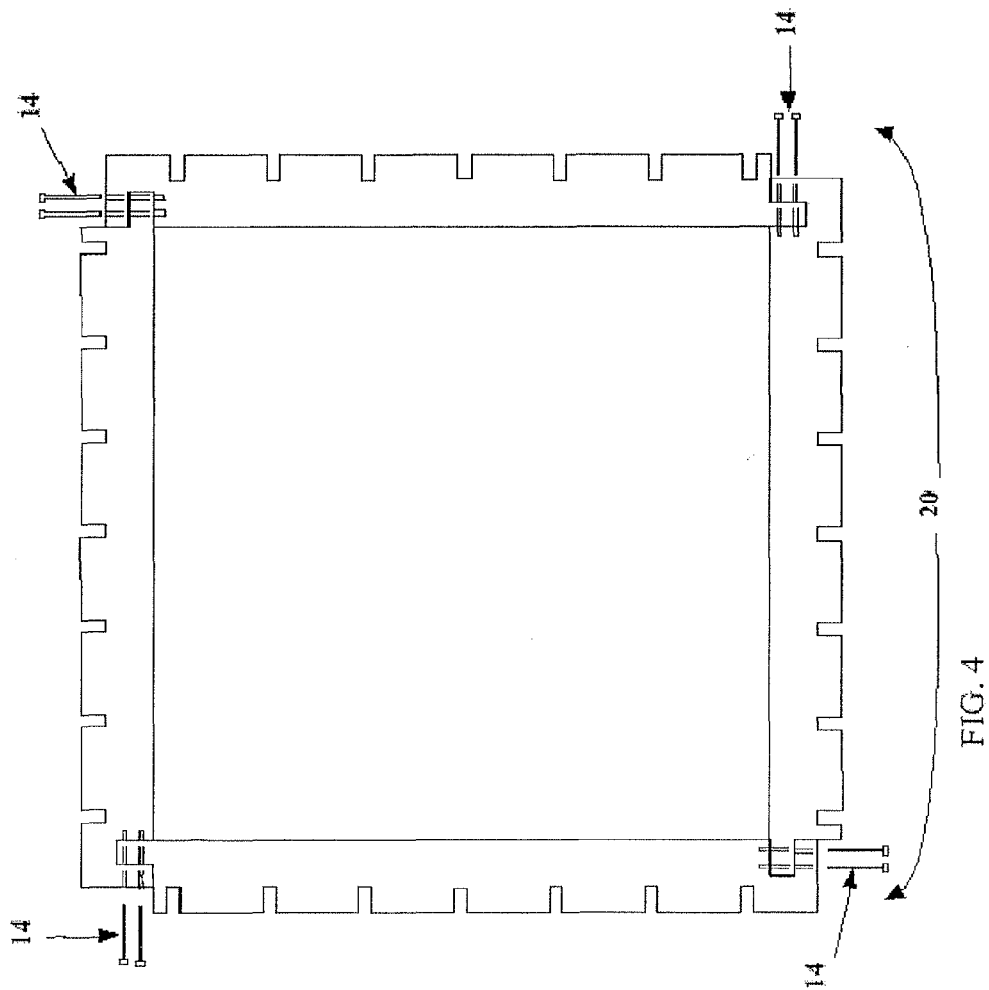
FIG. 4 depicts assembly of an exemplary tool useful for forming an explosive matrix assembly as disclosed herein.

In the illustrated embodiment, the side member 13 terminates in a protrusion 16 extending from one end 30, with the opposing end 31 including a cut-out 17 defined perpendicularly to the long axis of the side member 13. The cut-out 17 is dimensioned to snugly receive the protrusion 16 comprised in a second side member 13. Bore holes 29a are defined through the protrusion 16 and corresponding bore holes 29b, are defined in the walls defining the cut-out with the end most holes opening to the outer end of the member 13. As illustrated in FIG. 4, the tool 21 may be assembled by fitting the protrusion 16 of a first member 13 into the cut-out 17 of another such that the corresponding bore holes 29a, 29b align. Fastener pins 14 may then be inserted into the aligned bore holes 29a, 29b from the open outer thereof, thus fastening one end of one member with a counterpart end of a second member, forming a right angle. Assembly of the members 13 is repeated in this manner until a generally rectangular loom results with the castellated edges oriented away from the center of the tool shape. See FIG. 4. It will be appreciated that the ends of the members 13 may be fastened together in any suitable manner to form a secure perpendicular connection, including lap joints, hinged couplings, etc. Additionally, although bore holes 29a, 29b are depicted in the exemplary embodiment in corresponding pairs, more or less holes may be used.

Figure 5:
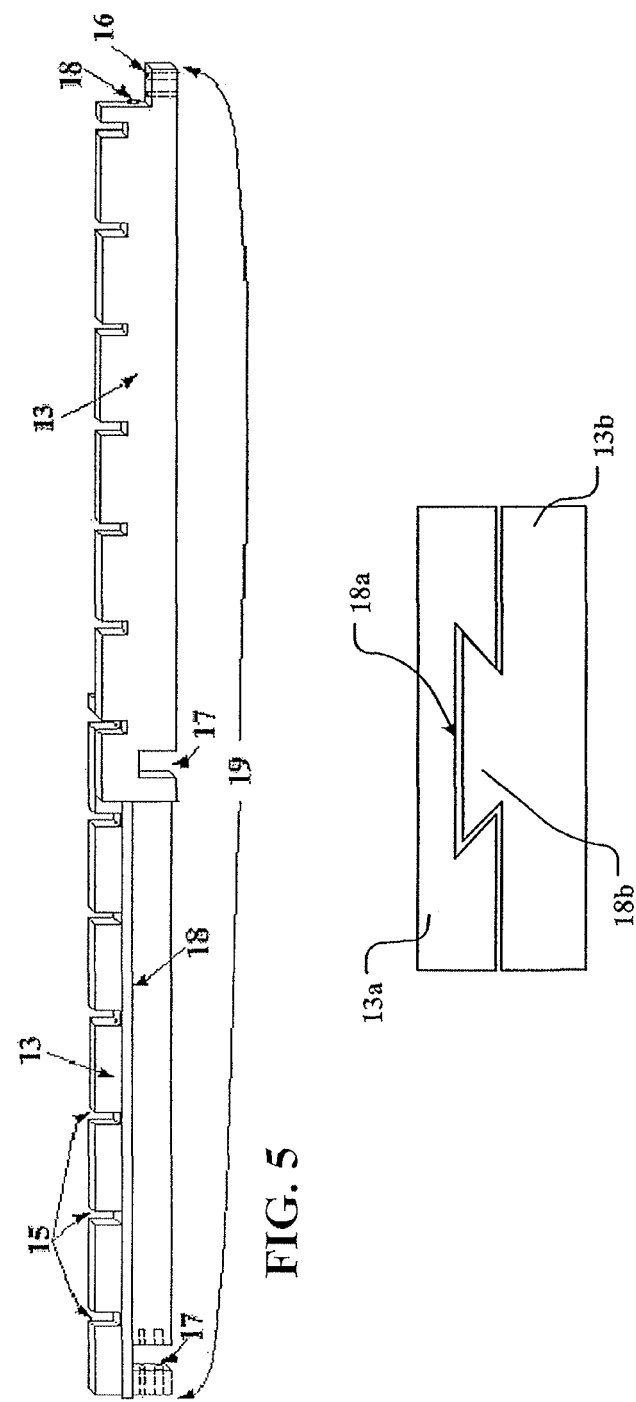
FIG. 5 depicts an exemplary side member comprising two slidingly engaged members showing an exemplary embodiment of an adjustably extendable side member.
Figure 6:
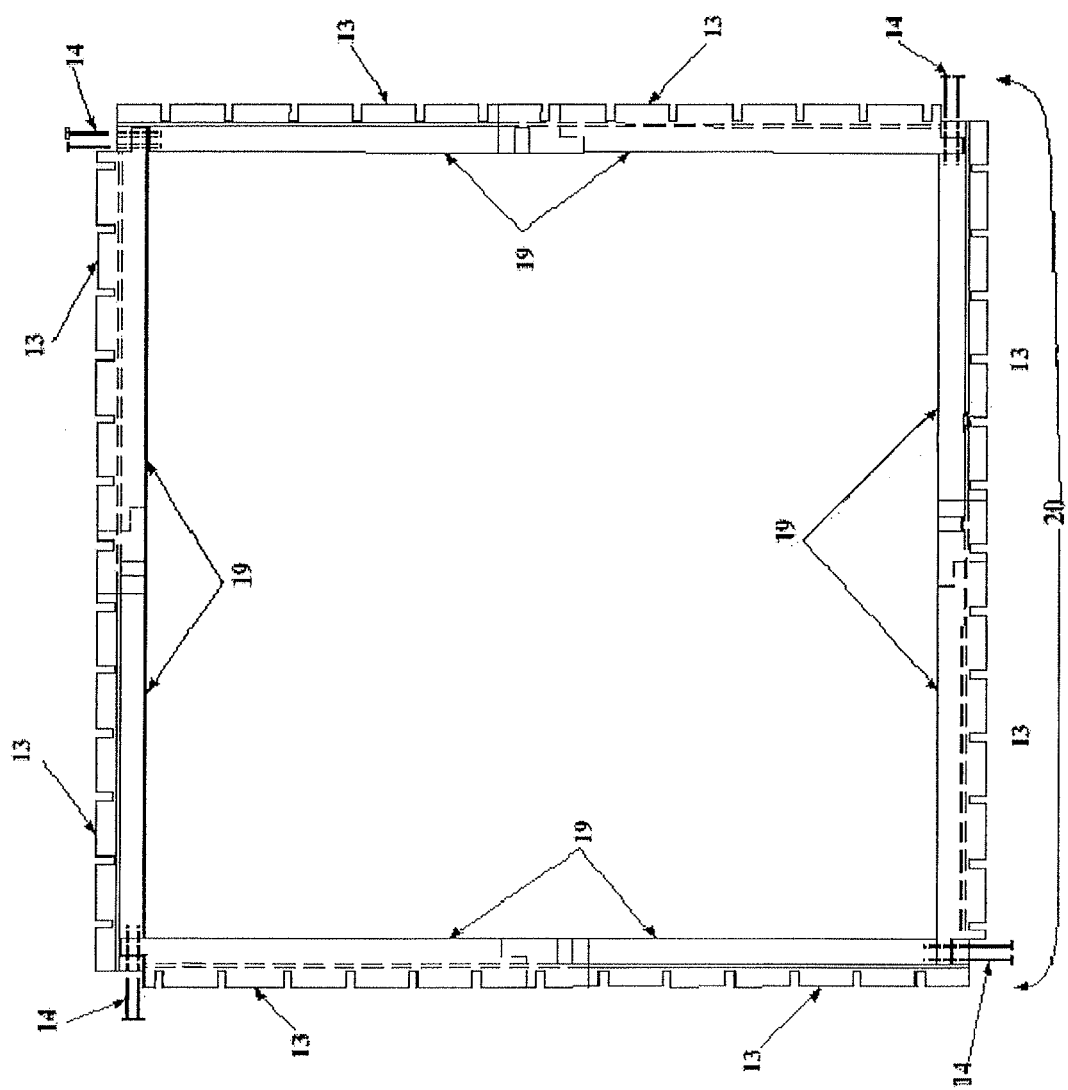
FIG. 6 depicts assembly of an exemplary tool useful for forming an explosive matrix assembly as disclosed herein comprised of the exemplary side members for FIG. 5.

In another embodiment, each side member 13 may comprise two parallel side members, 13a, 13b slidingly engaged with one another with their corresponding castellated edges 28 oriented in the same direction. The sliding attachment of the two members 13 may be accomplished by any suitable means known in the art. For example, with reference to FIG. 3A, one member 13 is paired with another member 13, using a sliding dovetail joint 18 to form a sliding pairs 20 with one member 13a having an elongated dovetail slot 18a lengthwise defined in a planar surface and the second member 13b having an elongated dovetail pin 18b extending from the opposing surface thereof. As depicted in FIGS. 5, and 6, the sliding pairs 19 may be assembled in the manner described earlier creating an adjustable assembly tool 21 facilitating the formation larger explosives matrix assemblies.

Once the matrix tool 21 is assembled it may be used to assemble the explosive matrix 1, by weaving a length of detonating cord 2 on the tool by inserting the cord into a first recess 15, stretching the cord across the tool and inserting the cord 2 into an opposite second recess 15, bending the cord around the adjacent interstitial tab 22 to insert into a third recess 15 adjacent the tab 22, and so on until the form depicted in FIG. 1 is complete. The matrix 1 grid is complete with end 6b back at the starting point.

Once the grid is complete, ties or tape 7 are used to hold ends 6a and 6b together in a closed loop 8, or abutted together and secured with adhesive sheet tape, or, for example, polyethylene foam sheets 22 and 23 with one surface coated with an adhesive which is place on either side of the grid and then pressed together to bond the grid 1 and sheets 22 and 23 together, as shown in FIG. 7.

The tool may be removed from the completed matrix assembly 1 by removing the fasteners 14 allowing the matrix assembly 1 to slide off the assembly tool.

Figure 8:
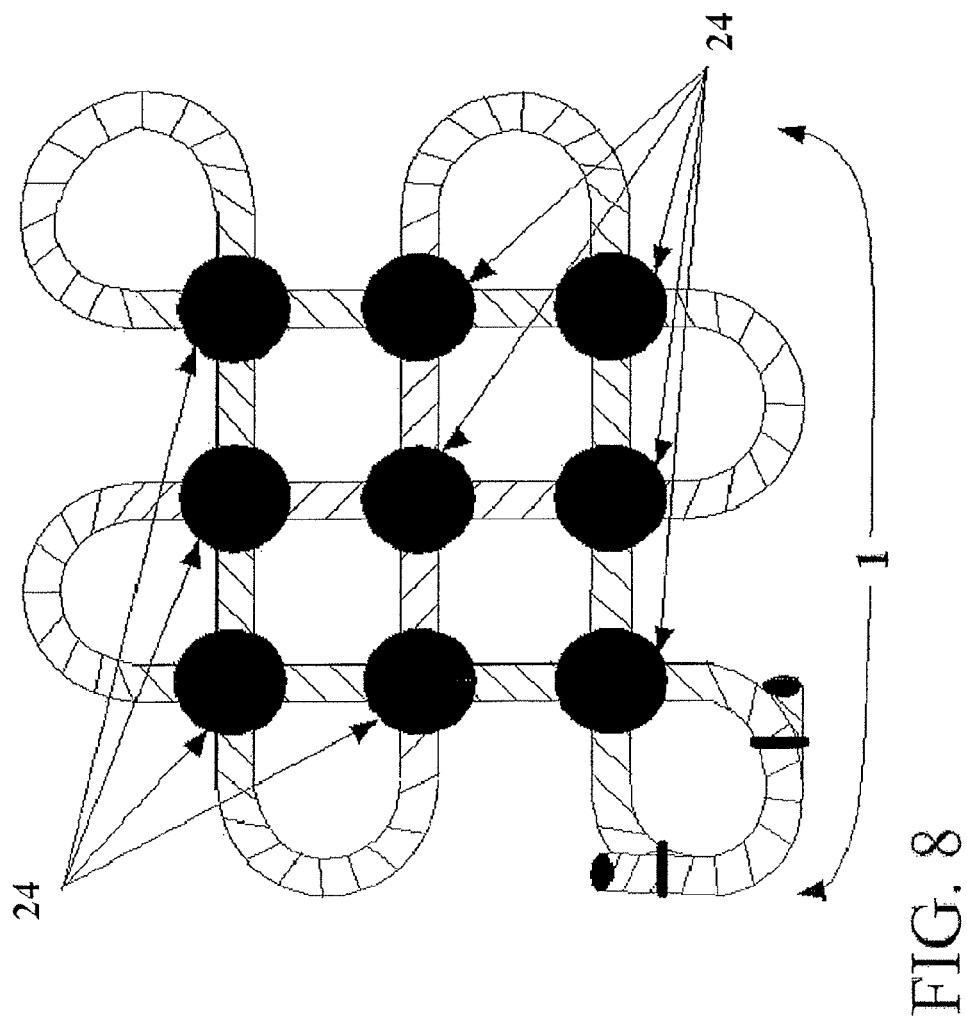
FIG. 8 depicts yet another exemplary embodiment an explosive matrix assembly as disclosed herein.
Figure 9:
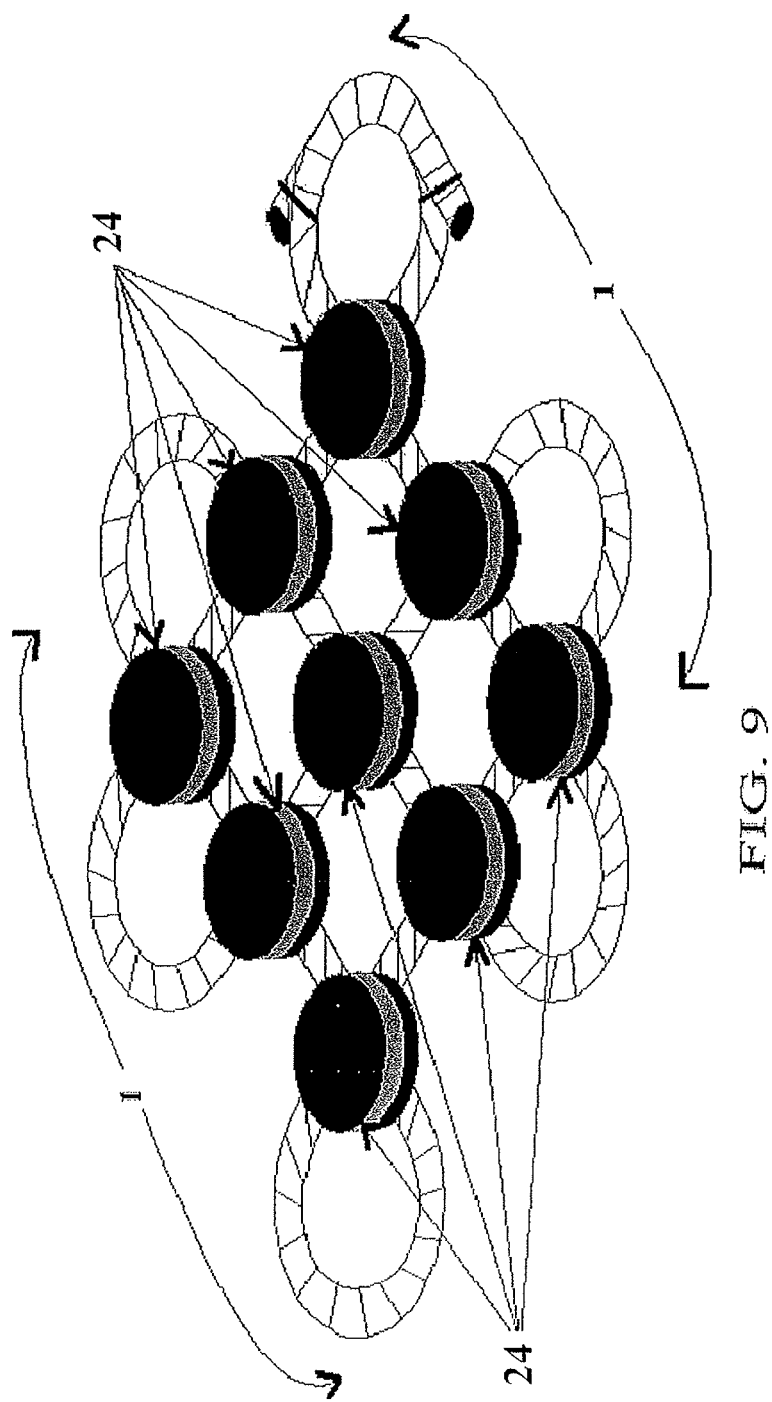
FIG. 9 is a perspective view of the embodiment depicted in FIG. 8.

In yet another alternative embodiment, the explosives matrix assembly 1 may be combined with a plurality of point explosives 24, such as sheet explosives, as shown in FIG. 8 and FIG. 9. The explosives matrix assembly 1 only needs to be of sufficient strength to initiate the point explosives 24. Because the point explosives 24 are the effective explosives charge, not the explosives matrix assembly 1, a lower grain of cord 2 may be used. Using the matrix assembly 1, point explosives 24 are placed at the points in the matrix assembly 1 where lengths of detonating cord 2 cross. Initiation of the detonating cord 2 will result in substantially simultaneous initiation of the point explosives 24 creating a shotgun effect with the point explosives 24. Thickness, weight, size, and type of the point explosives 24 may vary depending upon the needs of the explosives work to be done.

Figure 10:
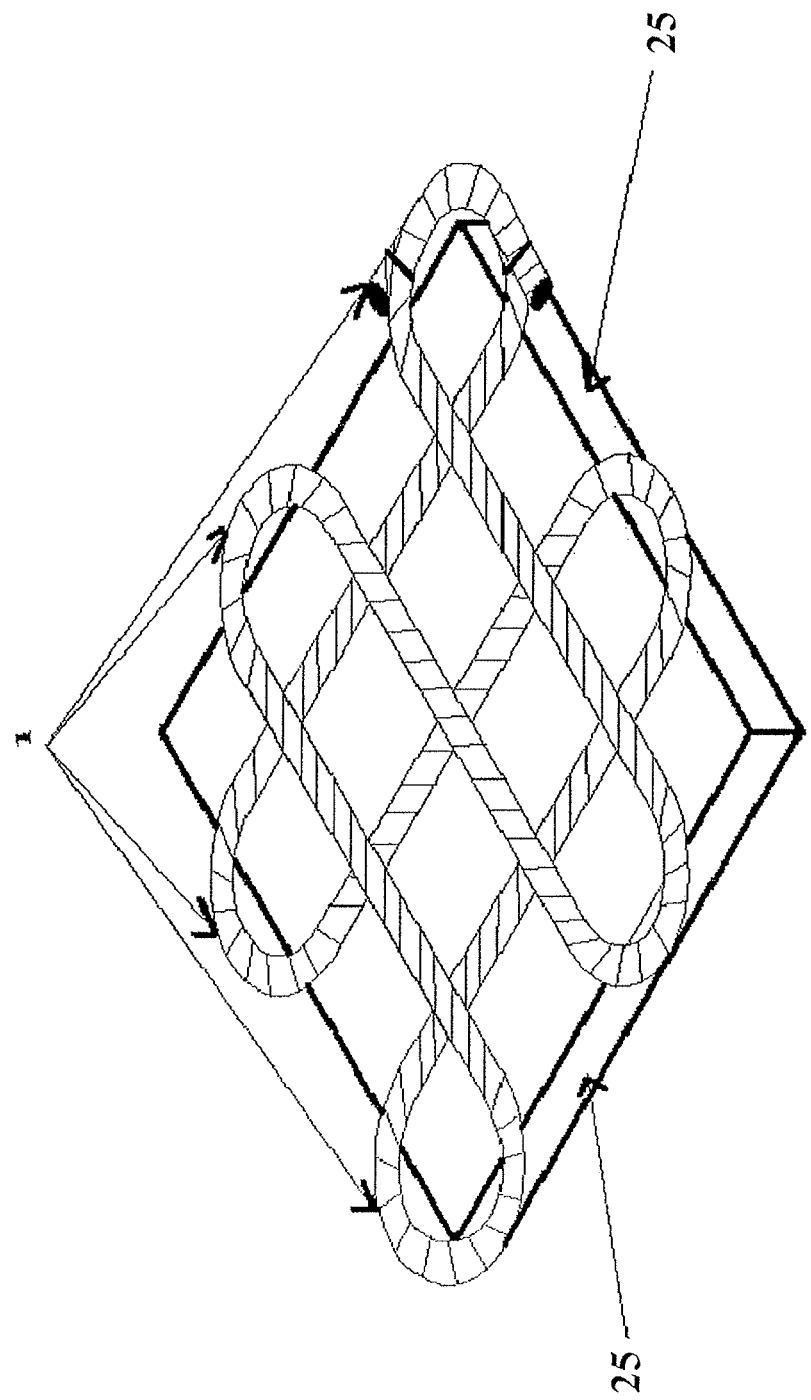
FIG. 10 shows another exemplary embodiment of an explosive matrix assembly as disclosed herein.

Yet another embodiment employs the explosives matrix assembly 1 to initiate insensitive blasting agents 25, such as ANFO (Ammonium Nitrate and Fuel Oil) in place of primers, as shown in FIG. 10. By using the explosives matrix assembly 1 to initiate the blasting agents 25, the critical diameter of the blasting agent 25 can be reduced below its normally accepted critical diameter without a low order detonation. If a greater surface area of the charges is desired or required, matrix assembly 1 panels may be connected together using cable ties or tape 12, as described above. All explosive charges so secured to one another can be initiated by the same explosives initiator 9.

Figure 11:
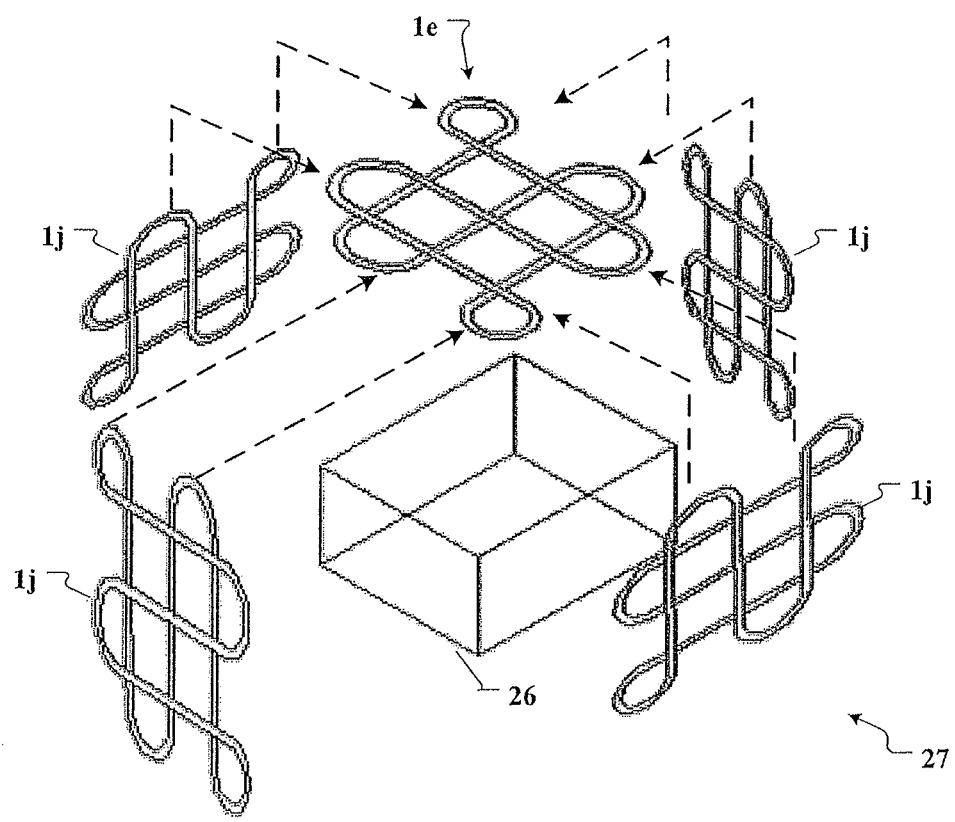
FIG. 11 illustrates yet another exemplary embodiment of the explosive matrix assembly as disclosed herein.

In a further embodiment and with reference to FIG. 11, the explosives matrix assembly 1e may be connected with other matrix assemblies 1j, e.g., attaching at least three panels, and preferably five or six panels, in a mutually perpendicular shape, i.e., a cube 27, advantageous as an explosives device 26 disruption charge (render safe) to defeat electronic switches and power sources, as shown in FIG. 11. A low energy detonating cord 2 may be employed in this example. The explosives device 26 is either placed in the cube 27 or the cube 27 is placed over the explosives device. All explosive matrix assemblies 1 so secured to one another can be initiated by the same explosives initiator 9.

As described above and shown in the associated drawings, the present invention comprises an explosive matrix assembly. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the assembly.

What is claimed is:

1. An explosive matrix assembly, comprising:
   a single detonating cord formed into a grid, the grid comprising:
      a first plurality of detonating cord portions lying in a first plane;
      a second plurality of detonating cord portions lying in a second plane and the first plurality of detonating cord portions perpendicularly overlay the second plurality of detonating portions, wherein the detonating cord comprises a first end and a second end and the first end is fastened to the second end in a loop; and
   a first sheet of material coupled to one side of the grid to retain the grid of the detonating cord;
   a second sheet of material coupled to an opposite side of the grid to retain the grid of detonating cord,
   wherein the first sheet is coupled to one side of the grid and the second sheet of material is coated to the second side of the grid.

2. The explosive matrix assembly of claim 1, wherein the first plurality of detonating cord portions are equally spaced apart.

3. The explosive matrix assembly of claim 2, wherein the second plurality of detonating cord portions are equally spaced apart.

4. The explosive matrix assembly of claim 1, wherein the overlaying of the second plurality of detonating portion over the first plurality of detonating portions form a plurality of crossing, each of the crossings consisting of no more than two portions of the detonating cord.

5. The explosive matrix assembly of claim 1, wherein each portion is contiguous with another portion and from each portion to the next contiguous portion is a loop.

6. The explosive matrix assembly of claim 1, wherein the first end is fastened to the second end with one or more ties.

7. The explosive matrix assembly of claim 1, wherein tape fastens the first end to the second end.

8. The explosive matrix assembly of claim 1, wherein the first ends overlaps the second end when fastened together.

9. The explosive matrix assembly of claim 1, wherein the first end and the second end abut when fastened together.

10. The explosive matrix assembly of claim 1, wherein an explosive initiator is coupled to the grid.

11. The explosive matrix assembly of claim 10, wherein the grid comprises an odd number the first plurality of detonating cord portions and an odd number of the second plurality of detonating cord portions.

12. The explosive matrix assembly of claim 1, wherein a perimeter of the grid is rectangular.

13. The explosive matrix assembly of claim 1, wherein the first plurality of detonating cord portions comprises three portions and the second plurality of detonating cord portions comprises three portions.

14. The explosive matrix assembly 1, wherein the sheet is a polyethylene foam sheet.

15. The explosive matrix assembly of claim 1, wherein one surface of each sheet comprises adhesive, and each sheet is coupled to the grid.

16. The explosive matrix assembly of claim 1, wherein the sheet of material is coated with an adhesive that couples the sheet of material to the grid.

17. The explosive matrix assembly of claim 1, wherein the grid is coated with an adhesive that couples the sheet of material to the grid.

18. An explosive matrix assembly, comprising:
   a single detonating cord formed into a grid, the grid comprising:
      a first plurality of detonating cord portions lying in a first plane;
      a second plurality of detonating cord portions lying in a second plane and the first plurality of detonating cord portions perpendicularly overlay the second plurality of detonating portions; and
   a first sheet of material coupled to one side of the grid to retain the grid of the detonating cord;

a second sheet of material coupled to an opposite side of the grid to retain the grid of detonating cord, wherein the first sheet is coupled to one side of the grid and the second sheet of material is coated to the second side of the grid; and a first loop portion coupling one of the plurality of first detonating cord portions to one of the plurality of second detonating cord portions and the first detonating cord portion is contiguous with the second detonating cord portion;

a second loop portion coupling another one of the plurality of first detonating cord portion to one of the plurality of second detonating cord portions, and the second loop is comprised of a first end of the detonating cord and a second end of the detonating cord.

19. The explosive matrix assembly of claim 18, wherein the first loop portion is diagonal to the second loop portion.

\* \* \* \* \*